United States Patent
Lawheed (10) Patent No.: US 6,672,064 B2
(45) Date of Patent: Jan. 6, 2004

(54) RANKINE CYCLE GENERATION OF ELECTRICITY

(75) Inventor: Paul Lawheed, San Diego, CA (US)

(73) Assignee: The Sun Trust, L.L.C., Spanish Fork, UT (US)

( * ) Notice: Subject to any disclaimer, the term of this patent is extended or adjusted under 35 U.S.C. 154(b) by 0 days.

(21) Appl. No.: 10/099,069

(22) Filed: Mar. 14, 2002

(65) Prior Publication Data

US 2003/0172654 A1 Sep. 18, 2003

(51) Int. Cl.[7] .............................................. B60K 16/00
(52) U.S. Cl. ................................... 60/641.11; 60/641.8
(58) Field of Search ........................... 60/641.8, 641.11, 60/641.15

(56) References Cited

U.S. PATENT DOCUMENTS

| | | | | |
|---|---|---|---|---|
| 3,811,804 A | * | 5/1974 | Roth et al. .................. | 251/205 |
| 3,943,719 A | * | 3/1976 | Terry et al. .................. | 376/324 |
| 3,945,346 A | * | 3/1976 | Daniels, Jr. .................. | 123/246 |
| 4,573,321 A | * | 3/1986 | Knaebel ....................... | 60/649 |
| 4,760,705 A | * | 8/1988 | Yogev et al. ............... | 60/641.8 |
| 5,005,360 A | * | 4/1991 | McMurtry .................... | 60/659 |
| 6,000,211 A | * | 12/1999 | Bellac et al. ............. | 60/39.182 |

* cited by examiner

Primary Examiner—Hoang Nguyen
(74) Attorney, Agent, or Firm—Lynn G. Foster (57) ABSTRACT

Systems or combinations and methodology for converting solar energy to electrical energy and thermal energy and for converting the resultant thermal energy to electrical energy are disclosed. Systems and methodology for conversion of low temperature thermal energy, wherever obtained, to electrical energy using a Rankine cycle mechanism to drive an electrical generator or do other work in a cost effective way are also disclosed.

47 Claims, 4 Drawing Sheets

RANKINE CYCLE GENERATION OF ELECTRICITY

RELATED APPLICATION

This application is related to copending U.S. patent application Ser. No. 09/867,196, filed May 29, 2001 and entitled CONVERSION OF SOLAR ENERGY, the contents of which are incorporated herein by reference.

FIELD OF INVENTION

The present invention relates generally to the generation of electricity and more particularly to: (a) solar generation of electricity in combination with Rankine cycle generation of electricity; and (b) use of a Rankine cycle mechanism to generate electricity or do other work.

BACKGROUND

Solar energy is freely and daily available. It is a clean, non-polluting source of energy. Providing a reliable, long term, cost effective, efficient way of using sunlight to obtain electrical and thermal power has long been an unsolved problem, until the present invention.

It has been proposed that flat panel solar converters be used to convert direct sunlight into thermal or electrical energy.

Pedestal supported flat panels using direct sunlight to generate electricity were part of the Solar One project.

A circular, but concave reflector mounted on a single column or pedestal has been proposed. This approach was used on the Soleras water desalination project in Saudi Arabia and on the Solar Two project in Dagget, Calif.

Fixed position concave reflectors placed in an array and positioned in side by side rows on an incline have ben proposed. See U.S. Pat. No. 4,202,322. Such an installation was made at the Federal Correctional Institution at Phoenix, Ariz.

Tiltable elongated concave reflector assemblies have been utilized, such as the one at Barstow, Calif., owned by FPL Energy SEGS VIII and IX.

Solar Systems comprising bidirectionally controlled Fresnel lens and solar cell assemblies, utilizing direct sunlight, have been proposed. See, U.S. Pat. No. 4,649,899, for example. Also see, U.S. Pat. No. 4,245,153. Optical detectors for dual axis tracking of the sun are known.

The above-identified proposals and installations have failed to provide reliable, low cost, efficient, variable capacity systems by which solar energy is converted to electrical energy. A long felt need has existed for solar energy conversion plants which are reliable, efficient, cost effective and size variable to meet both low and high capacity demands for thermal and electrical energy.

Further, the prior art has failed to maximize production of electricity from a solar generator by not using effluent coolant (by which the temperature of the solar generator is controlled) as a secondary source for producing additional electricity. Also, the prior art fails to meaningfully identify a commercial way by which a heated coolant, having only a moderately elevated temperature, can be used to cost effectively produce electricity or do other work.

Heretofore, the Rankine cycle principle has been applied to convert thermal energy into mechanical energy into electricity only in very expensive complex plants comprising steam driven turbines typically operating within a temperature range of 850° F. to 1100° F., under high pressure. Fossil fuels are used to drive boilers which produce the high temperature, high pressure steam. Fossil fuel conversion efficiencies of these types of installations may be as high as approximately thirty seven percent (37%).

BRIEF SUMMARY AND OBJECTS OF THE PRESENT INVENTION

In brief summary, the present invention overcomes or substantially alleviates long term problems of the prior art by which solar energy is cost effectively converted to electrical energy and thermal energy and the thermal energy is thereafter converted to electrical energy as well. The present invention also provides for conversion of low temperature thermal energy, wherever obtained, to electrical energy using a novel Rankine cycle mechanism to drive an electrical generator in a cost effective way. The Rankine cycle mechanism can do other work as well. The present invention provides reliable, cost effective ways for conversion of solar energy and thermal energy to electricity, where the size of the system can be correlated to the desired capacity.

With the foregoing in mind, it is a primary object of the present invention to overcome or substantially alleviate long term problems of the prior art by which solar energy is converted to thermal energy and electrical energy and the thermal energy is thereafter converted to electrical energy.

Another paramount object of the present invention is to provide reliable, cost effective systems and methods for conversion of solar energy to electricity and thermal energy and to thereafter use the thermal energy to create additional electricity or do other work, where the size of any such system can be correlated to a desired capacity.

Still another important object is to provide systems and methods for the conversion of low temperature thermal energy, wherever obtained, to electrical energy or do other wok using a novel Rankine cycle mechanism by which a generator is driven or another work performing mechanism is driven, in a cost effective way.

It is a further valuable object to provide a novel energy transforming Rankine cycle mechanism and related methodology.

These and other objects and features of the present invention will be apparent from the detailed description taken with reference to accompanying drawings.

DETAILED DESCRIPTION OF THE ILLUSTRATED EMBODIMENTS

The present invention is specifically related to solar generation of electricity in combination with secondary generation of electricity, or the doing of other work, using heated coolant from the solar generator in conjunction with a Rankine cycle mechanism and also to Rankine cycle production of work and/or generation of electricity using a fluid having a moderately elevated temperature.

The present invention utilizes, in some forms, the free and limitless energy of the sun to produce electricity and thermal energy. The scale of commercial installations of the present invention can be tailored to the need, ranging from small stand alone systems for residential and small business use to intermediate sized plants for plant or factory use to massive assemblies design to supplement the supply of electricity or to mitigate against if not eliminate an electrical energy crisis, such as the recent one in California. The present invention is economical to install and maintain, is reliable and not maintenance-intensive, is efficient and cost effective to operate and does not pollute the environment. The sun is not a consumable resource.

Using the present invention, businesses, industrial plants, retail and office buildings, homes, farms and villages can produce some, if not all, of their own electrical power, and avoid one of the largest if not the largest uncontrollable cost of doing business today—the ever-escalating price of purchased electrical power generated from fossil and nuclear fuels.

This invention is capable of making significantly more energy per square foot than conventional solar collectors. Prior art flat plate collectors are incapable of co-generating the large amounts of thermal energy that the present concentrating photovoltaic generating systems make, which thermal energy, in accordance with the present invention can be converted to electrical energy as well.

Until now, remote installations have been faced with a difficult choice, i.e. pay the prohibitive costs of bringing in utility power, or depend on costly, noisy, and hard to maintain pollution-creating diesel, gas or propane driven electrical generators. The present invention is a better choice, which can be scaled or sized to independently produce as much electrical energy as needed on site, such as the energy needed to power a home or business, pump water, irrigate land and run remote communication installations.

Unlike centralized forms of power generation, de-centralized use of on-site solar obtained electrical power needs no far-flung distribution network of gigantic towers and high voltage lines. Instead it utilizes a universally available asset—sunshine.

Decentralized sunlight-derived electrical power can free users from the effects of peak-hour brown-outs, and from the possibility of total black-outs caused by operator error, system breakdowns or planned terrorist's actions of groups hostile to utilities or nations.

The cost of the generating equipment itself used in the production of power for a building can be amortized over the life of the building, as part of debt financing (mortgage). Amazing as it may seem, one of the largest and most uncontrollable costs a building owner faces is the ever-escalating cost of electrical power. Using the present invention, one actually has the ability to eliminate most of the cost of purchased electrical power now and for years to come.

When land and water were plentiful and labor was cheap, little was known about the delicate balance existing between the environment and the extraction, burning, and wasting of non-renewable fuels. Now it is all too apparent that our supply of fossil fuels is limited—and that these sources are causing damage to our atmosphere, water supplies, and food chain—damage that is or may soon become irreversible. The costs, too, for fossil fuels continue upward as the more accessible fuel deposits are consumed, and as the costs for machinery, labor, and transportation continue to rise around the world.

Ironically, the best answer to the world's need for energy has always been the sun. The sun can satisfy a significant percentage of our energy requirements while helping us to become independent of the negative aspects inherent in conventional electrical power generation. Switching to solar-derived electrical power will reduce the pollution produced by coal, oil and nuclear fuels. It will also slow the use of coal and oil and allow us to conserve these resources for more later and perhaps valuable uses. Harnessing the sun will also reduce, or eliminate, the need for nuclear power and mitigate its many risks and problems.

Even though the sun is just beginning to contribute to satisfying the world's energy demands on a large scale, direct sunlight has been powering satellites and spacecraft since 1958. In the 1970's the first terrestrially-directed sunlight photovoltaic devices supplied power to locations too remote to have ties to utility lines. Then, as the solar industry developed more efficient silicon cells and generators, larger grid-connected direct sunlight installations became practical.

The present invention is not space-intensive. The present invention, in some forms, can be mounted on an existing rooftop so that it essentially takes up no additional space at all. Groundmounted systems on a pad or superimposed above a parking lot are also options as well. Column mounting is a further option.

Various embodiments of the present invention may be used in conjunction with residences, office buildings, manufacturing facilities, apartment buildings, schools, hospitals, remote communications, telemetry facilities, offshore platforms, water pumping stations, desalination systems, disinfection systems, wilderness camping, headquarters installations, remote medical facilities, refrigeration systems, farms and dairies, remote villages, weather stations, and air conditioning systems, to name a few.

The present invention is also useful in: (a) providing cathodic protection against galvanite corrosion, (b) storage of electrical energy in batteries, in some circumstances and (c) generation and sale of electricity to utility companies.

The sun is an energy source that, unlike fossil fuels, is free each day to whatever generation site is selected. It does not need to be mined, transported, refined, burned or purchased. So the costs for all these steps to produce energy are eliminated. Gone, too, are all forms of pollution. There are no particulates or gases vented into the atmosphere. Nor is there a need for millions of gallons of cooling water. (The small amount of liquid coolant used to cool the solar cells actually becomes a second form by which electrical power may be co-generated. In other words, production of thermal energy carried away by the coolant may be used to create additional electrical power.) Preferably, the liquid coolant is recirculated and reused to conserve the coolant There is no discharge of massive amounts of hot water into coastal waters to elevate the normal temperature and alter and perhaps destroy the habitats and food chains of coastal marine life. With solar energy, there are no wastes of any kind to be removed or buried in mines or dumped at sea, so there are few, if any, health risks to our generation or future generations.

Various embodiments of the invention are modular, allowing any installation to be large, medium or small so as to meet the exact needs of the installation for electrical energy. The electricity produced by solar cells of a solar electrical generator is direct current (DC), which, when appropriate, may be transformed into alternating current (AC) using an inverter or DC-to-AC converter. The electricity produced from thermal energy using a Rankine cycle mechanism according to the present invention may be DC, AC or three phase AC, depending on the type of generator selected for use with the Rankine cycle mechanism.

The prior art has failed to maximize production of electricity from a liquid cooled solar generator in that the coolant has not been used to co-produce additional electricity, or as a source by which other types of work can be done. The prior art fails to meaningfully identify a commercial way by which a heated liquid having only a moderately elevated temperature can be used to cost effectively produce electricity or do other work.

Previously, the Rankine cycle principle has been limited to conversion of thermal energy into mechanical energy, and thence into electrical energy, only in expensive, complex plants comprising steam driven turbines typically operated within the range of 850° F. to 1100° F., under high pressure. Fossil fuels often drive boilers which produce the high temperature, high pressure steam. Fossil fuel conversion efficiencies of these types of installations can be as high as approximately thirty seven percent (37%).

The present invention overcomes or substantially alleviates the long term problems of the prior art which failed to use solar energy to cost effectively convert the same to electrical energy and thermal energy as well, and failed to use the thermal energy to co-generate electricity. The present invention provides for conversion of low temperature thermal energy, however obtained, to electrical energy using a novel Rankine cycle mechanism to drive an electrical generator in a cost effective way. The mechanical energy of the Rankine cycle mechanism can do other work as well. The present invention provides reliable, cost effective ways for conversion of solar energy and/or thermal energy into electricity, where the size of the system can be cost effectively correlated to the desired capacity. The Rankine cycle aspects of the present invention employ a coolant comprising a low temperature heated liquid. The Rankine cycle mechanism drives a generator to produce electricity of the type desired. The low temperature heated liquid may be passed along a closed loop through a heat exchanger where heat is transferred from the liquid to a gas which, in turn, is displaced along another closed loop through the Rankine cycle mechanism. The heated liquid will have a temperature below its vapor point, e.g. the temperature of the liquid, when the liquid is water, will be 210° F. or less. The gas may be within the range of 50° F.–80° F., typically.

When the Rankine cycle aspects of the present invention are used in conjunction with a solar generator, there is an estimated thirty percent increase in the overall amount of electricity generated.

Generation of electricity in accordance with the present invention, allows for delivery of the energy at desired points in time, for example, when conventional sources of energy are inadequate, such as during peak load periods of time, or during blackouts or in settings where access to conventional electricity is either difficult or impossible.

The heated liquid can be stored in one or more insulated containers or tanks and used later at selected times to produce electricity using the Rankine cycle aspects of the present invention.

The Rankine cycle mechanism, in a presently preferred form, comprises a twin rotor, positive displacement device operated by displacement of low temperature fluid heated by liquid coolant used to cool the solar cells of a solar generator. Other sources of heated liquid having a temperature below the vapor point may be used to drive the Rankine cycle mechanism. Preferably, the heated liquid, when comprising a coolant used with a solar generator, is recirculated between the solar generator and heat exchanger. Preferably, the gas, passed through the same heat exchanger, is recirculated not only through the Rankine cycle mechanism but through a cooling tower or condenser as well before being returned to the coolant-gas heat exchanger, which causes the gas to expand and, therefore, aids in the gas being displaced through the Rankine cycle mechanism. Thus, both the coolant and the gas are contained within their respective closed loops, with the system being predicated upon low temperature, low pressure, pollution free operational characteristics. The overall efficiency of this system is projected to be over forty two percent (42%).

Thus, the present invention concerns itself with using solar energy to co-generate both primary and secondary electricity through conversion, at a solar electric generator, of solar energy to electrical energy and deriving further electricity by using the thermal energy, of a coolant used to control the temperature of the solar electrical generator, to drive a Rankine cycle generating system. In lieu of the secondary electricity, the coolant, at moderately elevated temperatures, can drive another mechanism which does other work. The coolant liquid will have a temperature below its vapor point and gas, heated by the coolant in a heat exchanger, will have a low temperature which may be within the range of 50° F.–80° F.

The Rankine cycle system comprises a Rankine cycle mechanism comprised of shaftmounted lobes, turned oppositely by successively applying the force of the heated gas to first one lobe and then to the other. The shafts upon which the lobes are respectively mounted are preferably interconnected by toothed wheels or gears so that rotation of one shaft mechanically causes an opposite rotation of the other shaft at the same speed and vice versa. The lobes are constructed so that there is no "blow-by" effect. Shaft rotation (mechanical energy) is used to do work, including but not limited to the rotation of a commercially-available electric generator.

After the heated gas has been used to drive the Rankine cycle mechanism, in the presently preferred embodiment, the gas is cooled in a cooling tower or the like, to which the liquid coolant is not directed.

The continuous flow of the coolant and the gas takes place in a closed system comprised respectively of a closed liquid flow loop and a closed gas flow loop. Thus, nothing is emitted to the environment or atmosphere which could potentially be harmful.

The electricity produced from commercial solar generators is DC, requiring use of a DC-to-AC converter to obtain AC electricity. The electricity derived from rotation of the Rankine cycle mechanism can be tailored as desired and may be used to produce any type electricity desired. The nature of the electricity produced as a result of rotation of the Rankine cycle mechanism will be determined by the nature of the generator selected for use.

A second heat exchanger (the cooling tower) comprises part of one of the disclosed system through which the gas is continuously displaced. The gas is also displaced through a first heat exchanger where heat from the liquid coolant, passed continuously but separately passed through the first heat exchanger is transferred to the gas. Displacement of the gas through its loop is by pump driven circulation, or by temperature differential or both. Circulation of the liquid coolant is by pump.

Figure 1:
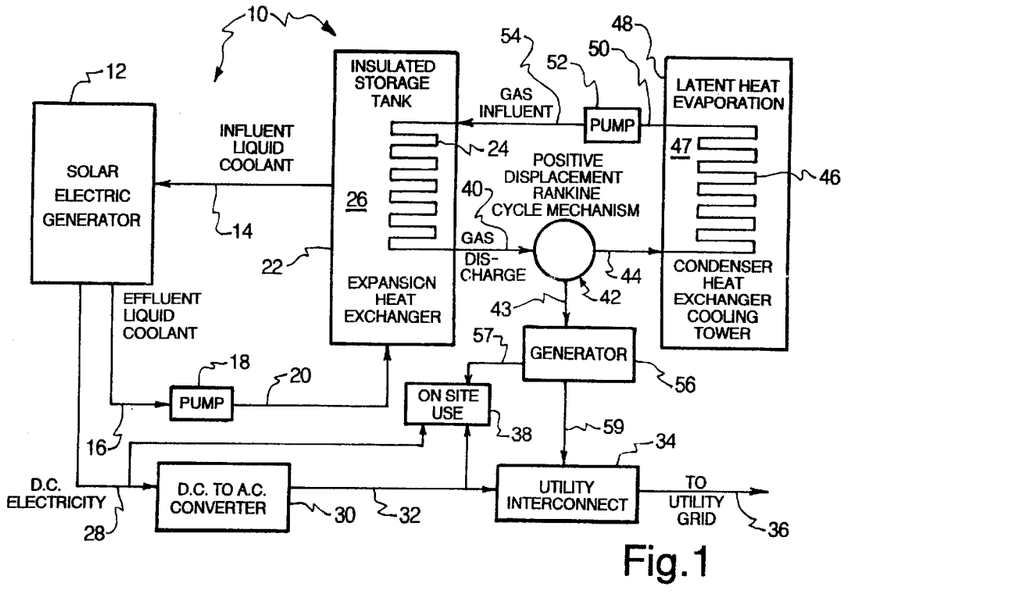
FIG. 1 is a schematic of a solar-to-electrical and thermal energy conversion system within the scope of the present invention, where the thermal energy is converted to electricity or used to do other work.

Specific reference is now made to the Figures wherein like numerals are used to indicate like parts throughout. Specifically, illustrated in diagrammatic or schematic form in FIG. 1 is one of several novel systems, generally designated 10, which also implements unique methodology. More specifically, FIG. 1 illustrates a solar electric generator 12, through which liquid coolant is circulated to cool solar cells. The liquid coolant is illustrated as flowing within a closed loop comprising an influent tube 14, a path through the generator 12 where heat created in a solar-to-electric process is transferred to the coolant, through an effluent tube 16, and thence a pump 18, a heat exchanger influent tube 20, and the interior of an insulated storage tank/expansion heat exchanger 22, in separation from the fluid in the form of gas circulated through coils 24 also disposed within the interior of the tank/heat exchanger 22. If desired the liquid in heat exchanger 22 may be contained in a coil juxtaposed the gas coil 24. The liquid coolant may be water having an elevated temperature below boiling. Output from a fuel cell may comprise the liquid introduced at tube 40.

The size of the tank/heat exchanger 22 may be a variable, ranging from extremely large to relatively small, depending upon design criteria. The smaller the tank/heat exchanger, the lower its storage capacity for the liquid coolant, the temperature of which is below the vapor point. The larger the tank the greater the storage capacity. The closed loop in which the liquid coolant is circulated accommodates, if desired, continuous circulation of coolant during the periods when the solar electric generator 12 is exposed to sunlight. During darkness or heavy overcast, the heated liquid coolant at the interior 26 of the tank/heat exchanger 22 can remain static, without circulation with the pump 18 off, as the expandable gas is displaced through the coils 24, in a manner and for purposes yet to be more fully described. The flow of the coolant and the gas is laminar, not turbulent. Heated liquid can also be stored in insulated tanks other than or in addition to tank 22 for Rankine cycle generation of electricity during darkness or cloudy days. In this way, storage of generated electricity in batteries can be eliminated or minimized.

While any liquid cooled solar electric generator may comprise generator 12, the solar generators disclosed in the above-mentioned copending U.S. patent application Ser. No. 09/867,196 may be utilized. The photovoltaic solar cells of these solar generators produce electricity, in a manner well understood, which is output from generator 12 along electric cable 28. This electricity is DC and can be used as such to drive DC devices, if desired. However, if AC electricity is desired, the DC electricity in line 28 may be converted at DC-to-AC converter 30 and transmitted thereafter as AC along cable 32 to either a utility interconnect 34 and thence along cable 36 to a utility grid or used on site, as depicted at 38 in FIGS. 1 and 2.

The heat transfer coils 24 through which the expandable gas mentioned above passes is part of a closed loop comprising seriatim, in the direction of flow beginning with the coil 24, a gas discharge tube 40, a Rankine cycle mechanism 42, a tube 44, through which gas discharge from the Rankine cycle mechanism 42 is displaced and from which the gas is introduced into a cooling coil 46 disposed in the interior 47 of a conventional cooling tower (heat exchanger) 48. Effluent gas from the cooling tower 48 is displaced along tube 50, through pump 52, if used, and once more introduced into the heating coil 24 through tube 54.

The output from the Rankine cycle mechanism 42 is used to drive a commercially available generator 56. As stated above, electricity derived from the generator 56 may be used in any suitable way, such as but not limited to site use, at 38 or sold to a utility company and communicated through the utility interconnect 34 to a utility grid system along cable 36.

Figure 2:
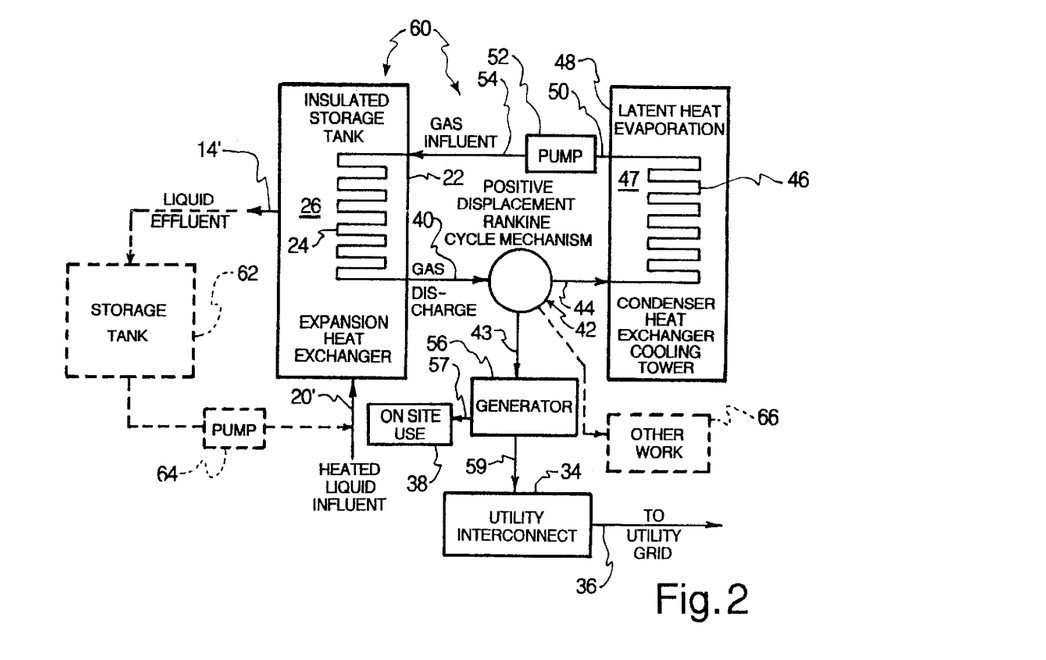
FIG. 2 is a schematic of a thermal-to-electrical energy conversion system within the scope of the present invention.

Reference is now made to FIG. 2, which illustrates a second system, generally designated 60, in accordance with principles of the present invention. A number of the components of the system 60 are identical to components of system 10, which are described above. Therefore, no further description of these components is needed at this juncture. Accordingly, only the differences found in FIG. 2, when compared with FIG. 1, will be explained. Independent of source, heated liquid having a temperature below the vapor temperature thereof, is introduced along tube 20' into the interior 26 of the tank/heat exchanger 22. The source of the heated liquid delivered through tube 20' can be any source such as geothermal water, discharged from any type of temperature lowering system, etc. The heated influent liquid can be passed through tank/heat exchanger 22 once or several times as deemed appropriate by those skilled in the art. The heated liquid delivered through influent tube 20' may also be stored, as explained above in tank/heat exchanger 22. The liquid with the interior 26 of tank/heat exchanger 22, when discharged, is discharged through effluent tube 14'. In situations where tank/heat exchanger 22 has inadequate heated liquid storage capacity, the quantity of heated liquid being processed or stored may be enlarged by using one or more insulated storage tanks 62, the contents of which is returned to the interior 26 of the tank/heat exchanger upon demand, using pump 64. In any event, heated liquid contained within the interior 26 of tank/heat exchanger 22, either in static position or being circulated therethrough, transfers heat to the previously mentioned gas passing through coils 24. Displacement of the heated gas drives the Rankine cycle mechanism 42, as explained above, such that electricity can be obtained when the Rankine cycle mechanism 42 turns generator 56, which electricity can be communicated through cable 57 for on-site or nearby use or through cable 59 to utility interconnect 34. In addition or in concert with driving generator 56, the Rankine cycle mechanism 42 illustrated in FIG. 2 may be used to turn another device by which other work is done, as depicted at site 66.

Reference is now made to FIGS. 3 through 6, which illustrate one appropriate form of the Rankine cycle mechanism 42, fashioned in accordance with the principles of the present invention. In some embodiments, the mechanism 42 provides the advantage of portability. While the capacity and size of the mechanism 42 may vary, RPM within the range of 200–5000 producing 5 horsepower can be produced. FIGS. 3 through 6 depict the illustrated Rankine cycle mechanism 42, with exterior side housings removed. The side housings are essentially opposite clamshells with aperture peripheral flanges, which, when assembled, prevent entry of debris and protect against injury. The side housings are respectively secured at the respective apertured flanges by screws which threadedly pass through the apertures of the flanges and aligned sequential threaded apertures 70 in the other components of the mechanism.

Exclusive of the housing, the Rankine cycle mechanism shown in FIGS. 3 through 6 comprises three successive contiguous plates 72, 74 and 76. Plates 72, 74 and 76 are relatively thin and planar, sized to create a close tolerance fit between the central plate 74 and the two exterior side plates 72 and 76 to thereby prevent fluid leakage at interfaces 78 and 80. Accordingly, plates 72 and 76 have interior and exterior smooth flat interior and exterior surfaces and are preferably formed of a suitable metal, which is not subject to corrosion and does not significantly expand due to the elevated temperature of the fluid passing through the mechanism 42 via influent tube 40 and effluent tube 42. A pressure at influent tube 40 of 15 psi under some circumstances may be suitable. Suitable metals for fabrication of plates 72 and 76 comprise aluminum, steel, and brass. One or both plates 72 and 76 may, in the alternative, be formed of a suitable dimensionally stable rigid synthetic resinous material, such as ABS or polytetrafluoroethylene, or composite materials may be used.

While other materials could be used to form layer 74, presently a wear resistant, dimensionally stable rigid and durable synthetic resinous material such as ABS, or polytetrafluoroethylene is preferred. Composite materials may also be used to form layer 74. Layer 74, unlike layers 72 and 76, is peripheral only, comprising a central, figure 8-shaped hollow interior 84, accommodating receipt and the close tolerance rotation of two adjacent, interfunctional lobes 86 and 88, as explained later in greater detail. See FIGS. 5 and 6. Lobes 86 and 88 may be formed of rigid dimensionally stable synthetic resinous material, metal or composites. The central layer 74 also comprises an interior influent discharge port 120, in open fluid communication with influent tube 40 by which the fluid in tube 40 is introduced successively into four lobe cavities, as explained herein in greater detail. The central layer 74 also comprises an effluent port 122 in open communication with discharge tube 42, for the purpose explained above. The male projections of the two lobes 86 and 88 comprise surfaces 110 and cavities 112, defined by surfaces 114 and 116. The lobes 86 and 88 are sized so that at times during opposite rotation, the projections each comprising surfaces 110 turn into and through the female cavities 112. See FIG. 6.

The oppositely rotating, intermeshing lobes 86 and 88 are non-rotatably connected, respectively, to the two parallel shafts 43, in any conventional way, such as by use of a press-fit race 89, or a key/keyway or set screw interconnection. The illustrated race 89 projects beyond the associated lobe 86 or 88. The shafts are rotatably journaled in apertures 94 of the outside plates 72 and 76, respectively, using bushings 90 and 92, one at each end of each shaft fitted for rotation into apertures 94 (FIG. 5) in each of the two side plates 72 and 76. The bushings 90 and 92 are slotted at 95 so that the radially size can be adjusted, by loosening or tightening an associated set screw 91 which threadedly crosses the slot to thereby size the bushing for close tolerance rotation in the apertures 94 while being non-rotatably connected to the associated shaft 43. The two shafts 43, respectively, terminate at their proximal ends a very short distance outside the plate 72. These proximal shaft ends are concealed by a pair of caps 96 (FIG. 4) screw fastened at 98 to the plate 72. Caps 96 may be formed any suitable material, such as acceptable synthetic resinous material.

Figures 3, 4:
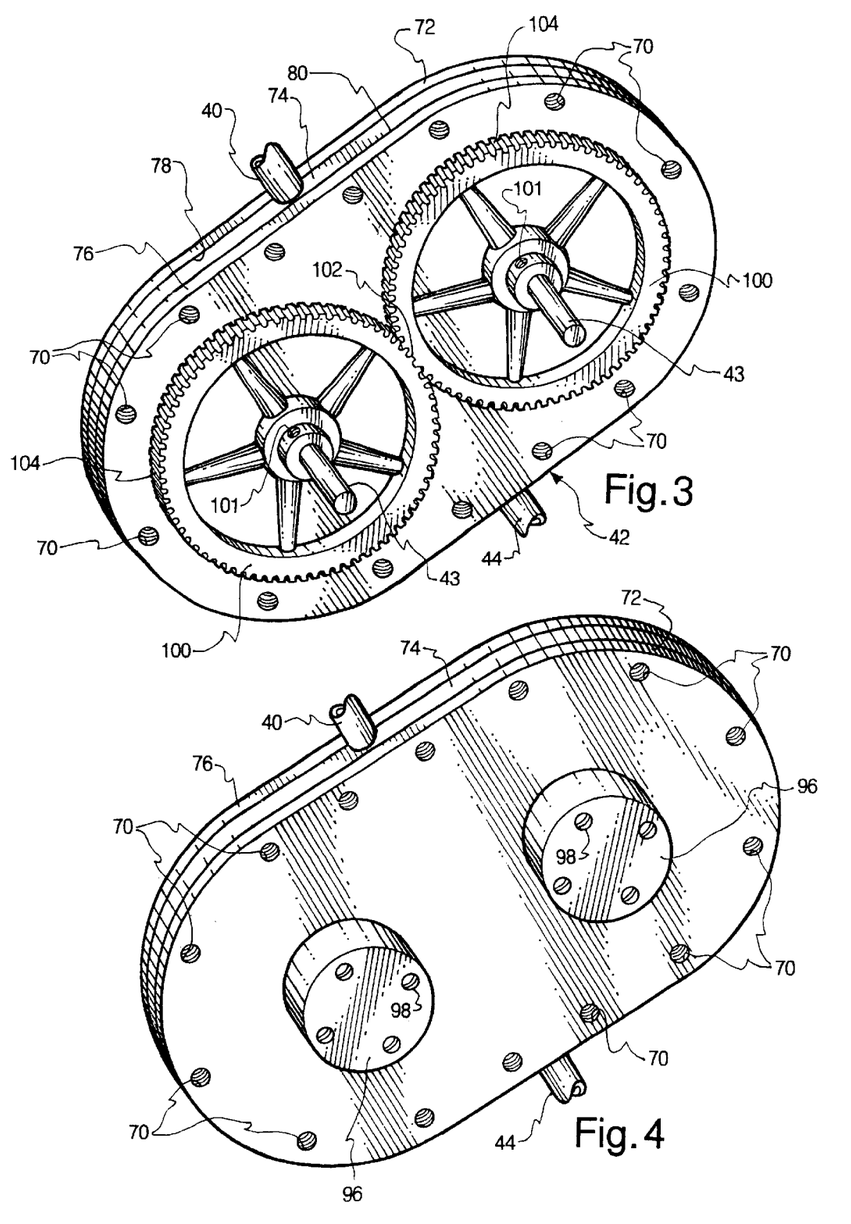
FIG. 3 is a perspective of a Rankine cycle mechanism, in its assembled condition, viewed from the mechanical output side, with the exterior housing removed, constructed in accordance with the principles of the present invention.
FIG. 4 is a perspective of the Rankine cycle mechanism of FIG. 3, in its assembled condition, viewed from the side opposite to FIG. 3.
Figure 5:
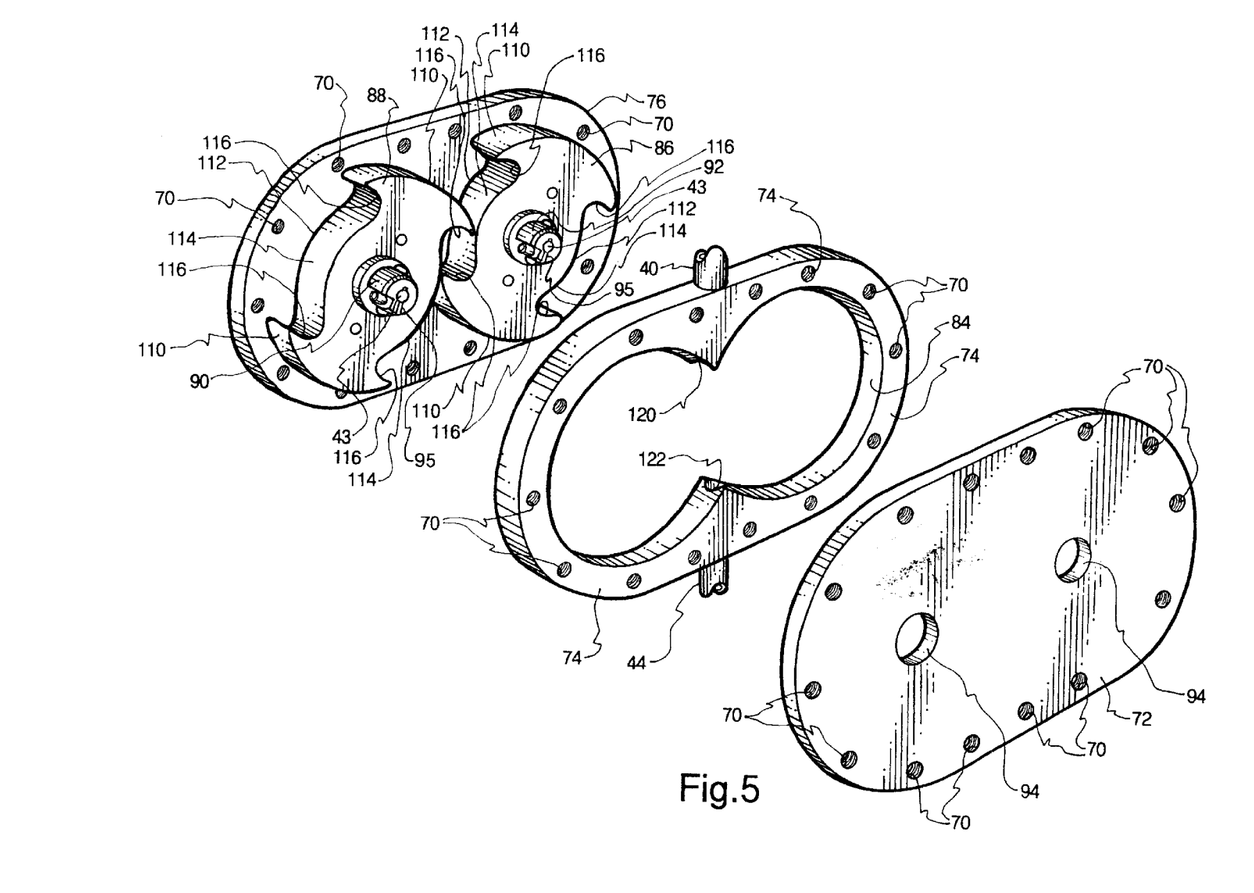
FIG. 5 is an exploded perspective of the Rankine cycle mechanism of FIG. 3 for clarity of illustration.

To the contrary, the distal ends of each shaft 43 projects well beyond the exterior surface of plate 76, as best shown in FIG. 3. Thus, the distal ends of the shafts are output shafts, the rotation or torque of which is converted to mechanical energy from which desired work is obtained, such as the generation of electricity.

A pair of interconnected toothed wheels or gears 100 are non-rotatably connected, respectively, to the two shafts 43 using any suitable technology. Set screws in threaded apertures 101 are illustrated in FIG. 3 as being used. Accordingly, when the lobes oppositely rotate, the two shafts 43 oppositely rotate and the two gears, interconnected at site 102, also oppositely rotate and at the same speed. As explained hereinafter in greater detail, the positive displacement, driving force of the influent fluid entering at port 40 drives one of the lobes at a first point in time, with the other lobe following by reason of the gear interconnection at site 102. Thereafter, the influent fluid drives the second lobe, with the first lobe becoming a follower, again by reason of the interconnection of gear teeth 104 at site 102.

The mechanical energy or torque, which occurs when shafts 43 rotate, is converted to electrical energy at generator 56 (FIGS. 1 and 2) or used to do other work at 66 (FIG. 2).

Figure 6:
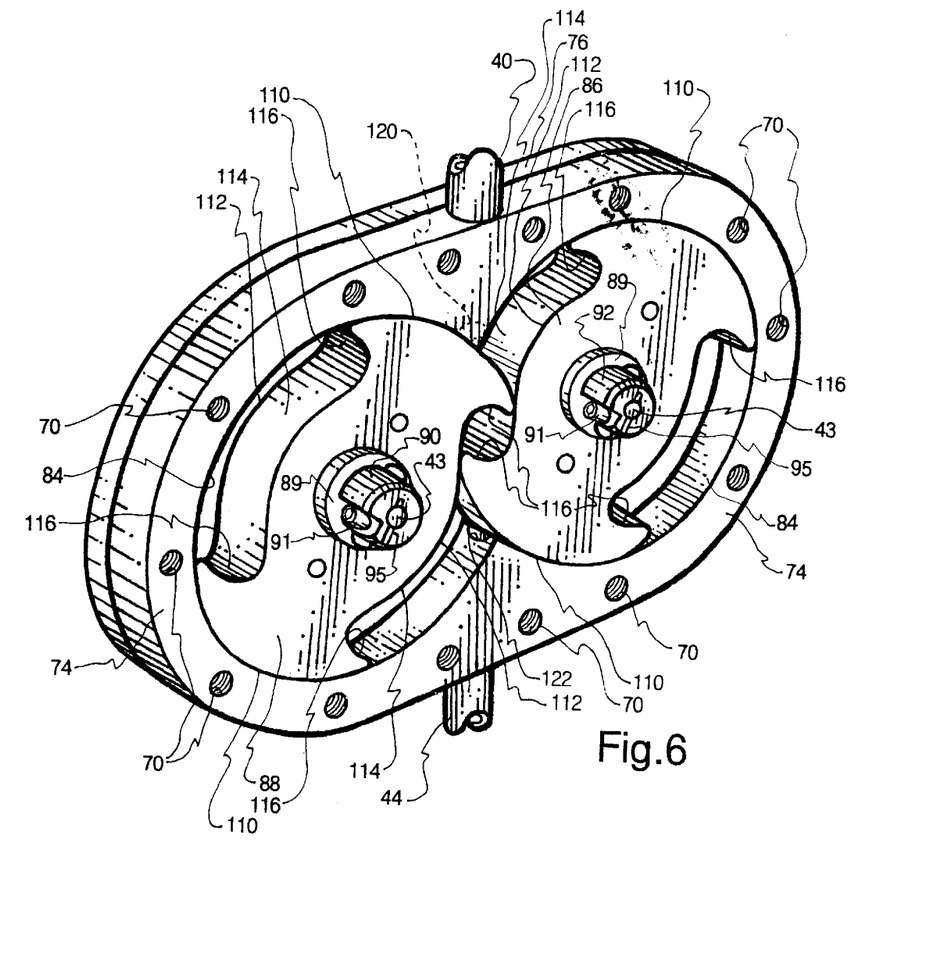
FIG. 6 is a perspective of the Rankine cycle mechanism of FIG. 3 with the near side plate removed, for clarity of illustration.

As can best be seen in FIG. 6, the lobes 86 and 88 are identical in the embodiment illustrated and described. Three hundred sixty degree (360°) rotation of each lobe will entail two driver intervals for each lobe and two idler or follower intervals for each lobe.

To prevent blow-by, each lobe comprises opposite maximum diameter male radial wall surfaces or edges 110, which rotate in close tolerance relationship with the figure 8 shaped surface 84 of the central peripheral layer 74, as best shown in FIG. 6. Because of the close tolerance relationship between surfaces 110 and surface 84, there is no material "blow-by" loss of pressure or fluid flow during rotation.

Further, each lobe 86 and 88 comprise opposed kidney-shaped slots or grooves 112. Slots 112 comprise a central reduced diameter radial surface 114 and forward and rear rounded surfaces 116 each of which merges with the associated outer radial surface 110 and the associated surface 114. The driving force of the influent fluid entering at influent tube 40 and interior port 120 is predominantly applied to the leading surface 116 within one groove 112 of the lobe 86 or 88 being driven by the fluid pressure at that point in time. The trailing surface 116 of the one groove 112 will cause discontinuance of influent fluid pressure against the associated leading surface 116 of the same kidney-shaped groove 112, once the trailing surface 116 passes the interior discharge port 120 and temporarily closes that groove 112 to fluid access from port 120. At this point in time, the leading surface 116 of one of the grooves 112 of the other lobe will be placed in communication with the influent fluid under pressure entering the Rankine cycle mechanism at interior port 120, so that the second lobe becomes the driver and the first lobe becomes the follower, as explained above. This alternation in driven lobe/follower lobe sequence occurs twice per lobe for each 360° rotation of the two lobes 86 and 88. Spent driving fluid is discharged through interior port 122 and out through effluent tube 44. See FIG. 6.

The fluid used to drive the lobes 86 and 88 may be of any suitable composition. A plurality of mechanisms 42 can be used in series, in parallel or both. Gas, including steam, is preferred, but under certain circumstance liquid may be used.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of using solar energy to generate primary and secondary electricity comprising the acts of:
   directly converting the solar energy to electricity at at least one solar cell;
   cooling the at least one solar cell with a liquid coolant in a first closed displacement loop;
   utilizing heat transferred from the liquid coolant without a chemical reaction to elevate the temperature of a gas in a second closed displacement loop;
   displace the gas to drive a non-combustion Rankine cycle electricity generating system associated with the second closed loop, but segregated from the first loop.

2. A method according to claim 1 wherein the utilizing act comprises passing the heated liquid coolant through a heat exchanger associated wit both loops to elevate the temperature of the gas being passed through the heat exchanger without a chemical reaction which turns the Rankine cycle electricity generating system by producing a torque at a Rankine cycle mechanism which in turn drives an electricity producing-generator.

3. A method according to claim 2 wherein the gas in the second loop comprises steam.

4. A method according to claim 1 wherein the electricity produced is direct current electricity.

5. A method according to claim 4 further comprising the act of converting the direct current electricity to alternating current electricity.

6. A method according to claim 2 wherein the liquid coolant is recirculated to the at least one solar cell and thence through the heat exchanger.

7. A method according to claim 2 wherein the gas is cooled after the utilizing act and thereafter recirculated through the heat exchanger and thence the Rankine cycle electricity generating system associated with the second loop.

8. A method according to claim 2 wherein the gas is displaced through a cooling device after passing through the Rankine cycle electricity generating system and thence to the heat exchanger within the second loop.

9. A method according to claim 2 wherein the liquid coolant displaced within the first loop from the at least one solar cell has a relative low temperature range below the vapor point and the gas displaced within the second loop is within a temperature range of 80° F. or less.

10. A method according to claim 2 wherein the gas within the loop is displaced into the Rankine cycle mechanism at a pressure on the order of 15 psi.

11. A method of using liquid at a moderately elevated temperature to cause a segregated gas to do work comprising the acts of:
    displacing liquid at an elevated temperature, below its vapor temperature, along a first closed loop only through a liquid-gas heat exchanger where the liquid and the gas are segregated and not commingled;
    displacing the gas along a second closed loop only through the liquid-gas heat exchange to transfer heat from the liquid to the gas without a chemical reaction where the liquid and the gas arc segregated and not commingled;
    displacing the gas along the second closed loop to rotate a non-combustion Rankine cycle lobe-displacement mechanism associated with the second loop but not the first loop to create rotation of at least one output shaft;
    converting the output shaft rotation to work.

12. A method according to claim 11 further comprising the act of recirculating the gas discharged from the Rankine cycle mechanism through the heat exchanger and back to the Rankine cycle mechanism.

13. A method according to claim 11 wherein the third displacing act comprises rotating two output shafts of the Rankine cycle mechanism and the converting act comprises work derived from the rotation of both shafts.

14. A method according to claim 13 wherein the two output shafts are geared together at a site space axially from the lobes of the Rankine cycle mechanism for common tough opposite rotation.

15. A method according to claim 12 further comprising the act of cooling the gas after it leaves the Rankine cycle mechanism and before it returns to the heat exchanger.

16. A method according to claim 11 wherein the converting act comprises causing the Rankine cycle mechanism to drive an electric generator via shaft rotation to obtain electricity.

17. A method of generating electricity by displacing a gas at a moderately elevated temperature through a non-combustion Rankine cycle mechanism comprising the acts of:
    displacing the gas, exclusive of pure hydrogen, along a closed loop at an above ambient temperature within a range which does not exceed 100° F. and at an influent pressure within a range on the order of 15 psi into a space between but not through oppositely rotatable intermeshing lobes respectively mounted on interconnected shafts of the Rankine cycle mechanism;
    applying the pressure of the gas: (a) first predominantly against an exposed surface on one lobe to forcibly rotate that lobe in a first direction causing the other lobe, through the interconnected shafts, to oppositely rotationally follow in a second direction and (b) second predominantly against an exposed surface of the other lobe to forcibly rotate the other lobe in the second direction causing the one lobe, through the interconnected shafts, to rotationally follow the first direction;
    driving an electric generator with one or both shafts to create electricity.

18. A method according to claim 17 wherein the gas comprises steam.

19. A system for using solar energy to co-generate primary and secondary electricity comprising:
    a solar generator comprising solar cells against which sunlight is impinged to directly convert solar energy to electricity;
    a cooling unit for cooling the electricity-producing solar cells with liquid coolant;
    a non-combustion Rankine cycle mechanism which utilizes heat derived from the liquid coolant without chemical reaction to drive a generator to also produce electricity.

20. A system according to claim 19 wherein the cooling unit comprises a heat exchanger by which the elevated temperature of the liquid coolant increases the temperature of a gas being passed through the heat exchanger and rotating the Rankine cycle mechanism, the Rankine cycle mechanism comprises at least one output shaft the rotation of which drives the generator.

21. A system according to claim 20 wherein the gas comprises the steam.

22. A system according to claim 19 wherein the electricity produced by the solar generator is direct current electricity.

23. A method according to claim 22 further comprising a direct current-to-alternating current converter by which the direct current electricity is transformed to alternating current electricity.

24. A method according to claim 20 wherein the cooling unit comprises a recirculator by which liquid coolant is continuously recirculated between the solar cells and the heat exchanger.

25. A system according to claim 20 wherein the cooling unit comprises a recirculator by which the gas isolated from the liquid coolant is continuously recirculated through the heat exchanger and the Rankine cycle mechanism.

26. A system according to claim 25 wherein the cooling unit further comprises a second heat exchanger whereby the gas is continuously displaced through the second heat exchanger after passing through the Rankine cycle mechanism and before being returned to the first heat exchanger.

27. A system according to claim 20 wherein the liquid coolant displaced from the solar cells has a relative low temperature below its vapor temperature and the gas is within the temperature range below the temperature of the liquid coolant.

28. A system according to claim 20 wherein the gas is displaced into the Rankine cycle mechanism at a pressure of on the order of 15 psi.

29. A system for using liquid at a moderately elevated temperature to do work comprising:
   liquid-gas heat exchange through which a liquid in a first closed loop at an elevated temperature below its vapor point is displaced and through which a gas in a second closed loop is displaced to transfer heat from the liquid to the gas without generation of hydrogen through a chemical reaction while keeping the liquid and the gas separate;
   a Rankine cycle lobe-displacement mechanism using the gas passed therethrough, after discharge from the heat exchanger, to rotate at lest one output shaft;
   a device driven by the shaft rotation to do work.

30. A system according to claim 29 further comprising a pump by which the gas is recirculated through the Rankine cycle mechanism and the heat exchanger.

31. A system according to claim 30 further comprising a gas cooler for cooling the gas after it leaves the Rankine cycle mechanism and before it returns to the heat exchanger.

32. A system according to claim 29 wherein the Rankine cycle mechanism comprises two oppositely rotated output shafts both of which drive the work device.

33. A system according to claim 32 wherein the Rankine cycle mechanism comprises two interconnected shaft-mounted, oppositely rotating gears respectively non-rotatably connected to two output shafts for common tough opposite rotation.

34. A system according to claim 29 wherein the work device comprises an electric generator turned by rotation of the at least one shalt to obtain electricity.

35. A system for generating electricity by displacing a fluid at a moderately elevated temperature comprising:
   a Rankine cycle mechanism into which the fluid is introduced at a temperature within a range on the order of 100° F. or less and at a pressure within a range of on the order of 15 psi into a space between but not through either oppositely rotatable lobes, the lobes being respectively mounted on interconnected shafts of the Rankine cycle mechanism;
   such that the pressure of the fluid is: (a) first applied against one lobe to forcibly rotate that lobe in a first direction causing the other lobe, through the interconnected shafts, to oppositely rotate in a second direction and (b) ten is applied against the other lobe to forcibly rotate the other lobe in the second direction causing the one lobe, through the interconnected shafts, to rotate in the first direction;
   an electric generator connector to one or both shafts to create electricity.

36. A system according to claim 35 wherein the fluid is a gas.

37. A system according to claim 36 wherein the gas comprises steam.

38. A Rankine cycle mechanism comprising:
   1. three contiguous narrow planar segments arranged in a series comprising:
      a. first and third narrow planar segments defining exterior sides of a housing and opposite interior side surfaces of a central narrow planar chamber.
      b. a second narrow planar segment contiguously interposed between the first and third planar segments defining an exterior edge of the housing and the narrow planar chamber;
   2. two intermeshed rotatable narrow contoured lobes within the narrow planar chamber;
   3. at least one output shalt non-rotatably connected to one of the lobes, journaled in the first and third narrow planar segments for rotation of the shaft with the connected lobe, the shaft extending beyond the housing and the rotation of the output shaft producing work.

39. A mechanism according to claim 38 wherein the three contiguous narrow planar segments are held together by threaded fasteners.

40. A mechanism according to claim 38 wherein the housing comprises an influent port through which gas is introduced into the chamber between the lobes to turn them.

41. A mechanism according to claim 40 wherein to influent port is located in the second planar segment.

42. A mechanism according to claim 38 wherein the housing comprises an effluent port through which gas is discharged from the chamber at a site between the lobes.

43. A mechanism according to claim 38 wherein the at least one output shaft comprises two output shafts, one non-rotatably connected to each lobe and flitter comprising a gear mounted non-rotatably to each output shaft so that the gears intermesh and oppositely rotate with the lobes, the gears being remote from the chamber and exterior of the housing, the rotation of each output shaft producing work.

44. A mechanism according to claim 38 wherein the lobes are passageway free.

45. A method of producing electricity using two closed fluid displacement loops, one loop comprising a heat transfer only loop which does not generate electricity, and the other loop comprising an electricity-generating loop, comprising the acts of:
   heating a first circulated fluid along the heat transfer loop and passing the fluid as a liquid having a temperature below the vapor point through a heat exchanger;
   without chemical reaction, displacing a second circulated fluid along the electricity-generating loop, through the heat exchanger separate from the first fluid and thence as a gas through a non-combustion Rankine cycle mechanism to turn the Rankine cycle mechanism and at least one generator to produce electricity.

46. A method according to claim 45 wherein the first fluid is at all times a liquid having a temperature below its vapor point and the second fluid is at all times a gas having a temperature above its vapor point.

47. A method according to claim 45 wherein the displacement of the second fluid through the Rankine cycle mechanism engages, flows between but does not flow through either of two oppositely rotating lobes and wherein the lobes turn oppositely rotating drives to drive two electric generators.

* * * * *